United States Patent
Schonlau et al.

(10) Patent No.: US 8,231,182 B2
(45) Date of Patent: Jul. 31, 2012

(54) METHOD FOR CREATING LOW PRESSURE IN A BRAKE ACTIVATION DEVICE OF A MOTOR VEHICLE BRAKE SYSTEM

(75) Inventors: Jürgen Schonlau, Walluf (DE); Manfred Rüffer, Sulzbach (DE); Horst Krämer, Ginsheim-Gustavsburg (DE); Michael Jürging, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 610 days.

(21) Appl. No.: 12/307,431

(22) PCT Filed: May 10, 2007

(86) PCT No.: PCT/EP2007/054535
§ 371 (c)(1),
(2), (4) Date: Sep. 29, 2009

(87) PCT Pub. No.: WO2008/003547
PCT Pub. Date: Jan. 10, 2008

(65) Prior Publication Data
US 2010/0005796 A1     Jan. 14, 2010

(30) Foreign Application Priority Data

Jul. 6, 2006 (DE) .......................... 10 2006 031 632
Sep. 29, 2006 (DE) .......................... 10 2006 046 478

(51) Int. Cl.
*B60T 13/46* (2006.01)
(52) U.S. Cl. ...................................... 303/11; 303/114.3
(58) Field of Classification Search ............... 303/114.1, 303/114.3, 115.2, 10–12; 60/397, 407–412, 60/721
See application file for complete search history.

(56) References Cited

U.S. PATENT DOCUMENTS

| | | | |
|---|---|---|---|
| 5,961,189 A * | 10/1999 | Lutteke et al. | 303/114.3 |
| 6,301,883 B1 * | 10/2001 | Fulks et al. | 60/397 |
| 6,412,881 B1 * | 7/2002 | Isono | 303/114.1 |
| 2007/0240421 A1 * | 10/2007 | Schonlau et al. | 60/721 |

FOREIGN PATENT DOCUMENTS

| | | |
|---|---|---|
| DE | 199 29 880 A1 | 1/2001 |
| DE | 10 2005 027 768 A1 | 4/2006 |
| EP | 0 553 010 A1 | 7/1993 |
| EP | 1 123 848 A1 | 8/2001 |
| EP | 1 538 307 A1 | 6/2005 |
| EP | 1 681 219 A2 | 4/2006 |
| WO | WO 93/11983 | 6/1993 |
| WO | WO 2005/123476 A1 | 12/2005 |

* cited by examiner

*Primary Examiner* — Christopher Schwartz
(74) *Attorney, Agent, or Firm* — RatnerPrestia

(57) ABSTRACT

A method for creating low pressure in a brake activation device of a motor vehicle brake system, comprising a pneumatic brake force booster the interior of which is divided into at least one low-pressure chamber and one working chamber, a brake master cylinder and a pneumatic motor pump unit for creating the low pressure in the low-pressure chamber, which motor pump unit comprises a low-pressure pump and a motor driving the low-pressure pump, a low-pressure level in the low-pressure chamber or a pressure difference between the low-pressure chamber and the working chamber being detected by a sensor and the motor pump unit being activated by an electronic control unit if the pressure falls below a first predefined, lower low-pressure level Pe in the low-pressure chamber and being deactivated if a second predetermined, upper low-pressure level Pa is reached.

10 Claims, 2 Drawing Sheets

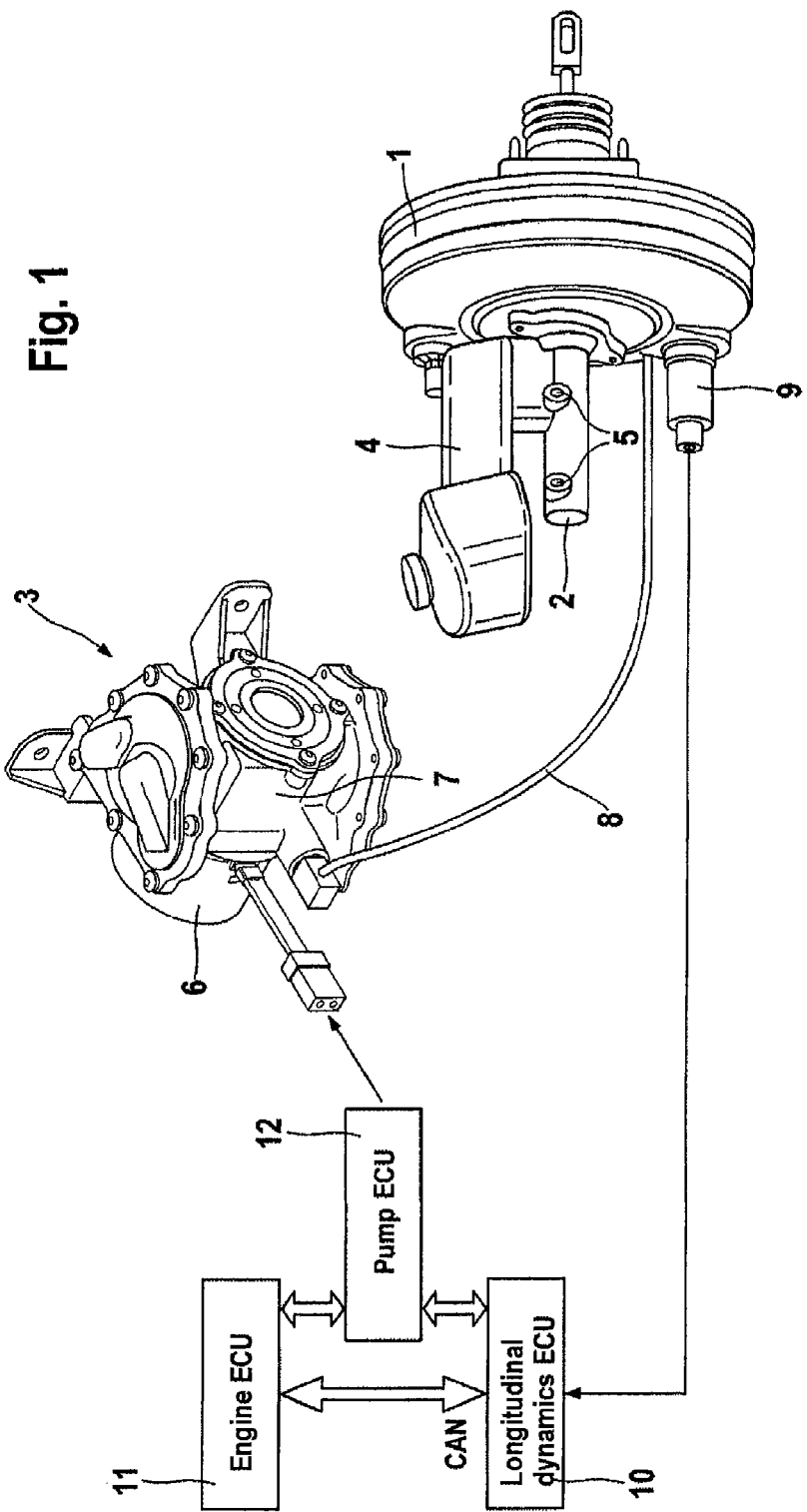

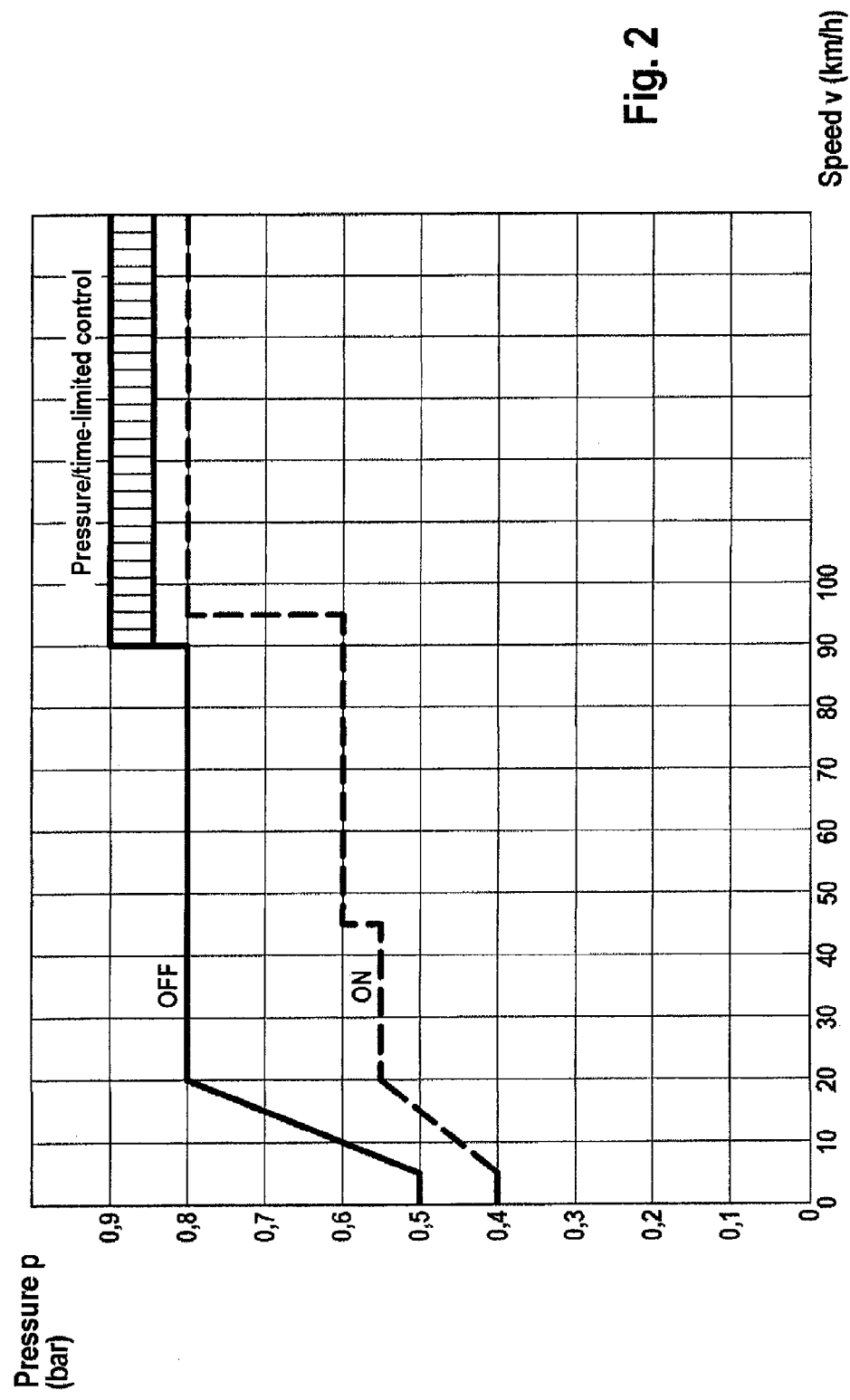

METHOD FOR CREATING LOW PRESSURE IN A BRAKE ACTIVATION DEVICE OF A MOTOR VEHICLE BRAKE SYSTEM

CROSS REFERENCE TO RELATED APPLICATIONS

This application is the U.S. national phase application of PCT International Application No. PCT/EP2007/054535, filed May 10, 2007, which claims priority to German Patent Application No. DE102006031632.0, filed Jul. 6, 2006 and German Patent Application No. DE102006046478.8, filed Sep. 29, 2006, the contents of such applications being incorporated by reference herein.

BACKGROUND OF THE INVENTION

1. Field of the Invention

The invention relates to a method for creating low pressure in a brake activation device of a motor vehicle brake system.

2. Description of the Related Art

The invention relates to a method for creating low pressure in a brake activation device of a motor vehicle brake system, comprising a pneumatic brake force booster the interior of which is divided into at least one low-pressure chamber and one working chamber, a brake master cylinder and a pneumatic motor pump unit for creating the low pressure in the low-pressure chamber, which motor pump unit includes a low-pressure pump and a motor driving the low-pressure pump, a low-pressure level in the low-pressure chamber or a pressure difference between the low-pressure chamber and the working chamber being detected by means of a sensor and the motor pump unit being switched on by an electronic control unit if the pressure falls below a first predefined, lower low-pressure level in the low-pressure chamber and being switched off if the pressure reaches a second predefined, upper low-pressure level.

A method of this type is known, for example, from DE 199 29 880 A1, the low-pressure pump described therein being provided as a low pressure auxiliary pump which is connected when needed to the internal combustion engine serving as the main low pressure supplier, depending on operating states of the latter.

However, through the increased use of regenerative brake systems based on a brake force booster which can be activated in a driver-independent manner, which systems are used, for example, in hybrid vehicles with an electric motor and an internal combustion engine, operating states occur in these vehicles in which the internal combustion engine does not supply any low pressure for the brake activation device.

Furthermore, in particular in pure electric vehicles the required pressure must be generated solely by means of such a low-pressure pump.

Activation of the motor pump unit is usually effected when the pressure falls below a first predefined, lower low-pressure level (approximately 0.6 bar low pressure, that is, 0.4 bar absolute) in the low-pressure chamber. If a second predefined, upper low-pressure level (approximately 0.8 bar low pressure, that is, 0.2 bar absolute) is reached, the motor pump unit is switched off in order to reduce the load on the motor pump unit and therefore to prolong its service life.

However, tests have shown that when the low-pressure pump is used as the sole low pressure supplier the so-called overload point of the brake force booster, at which the maximum boost of the activation force is present and a further pressure build-up is possible only through a rise in the input force equal to the output force, can be very much lower in operation through the reduction in volume of the low-pressure chamber than with an internal combustion engine as the low pressure supplier.

SUMMARY OF THE INVENTION

In view of the foregoing, an object is to offer a method for solving this problem of ensuring an adequate output of the brake force booster while using a low-pressure pump as the sole, or temporarily sole, low pressure supplier.

To achieve this object a method is proposed the special feature of which is that the first predefined, lower low-pressure level and the second predefined, upper low-pressure level in the low-pressure chamber are controlled as a function of a speed of the vehicle. In other words, an adjustment of the first or second low-pressure level at which the motor pump unit is switched on or off is effected as a function of the speed of the vehicle. It is thus possible to increase the low-pressure level in the low-pressure chamber of the brake force booster in particular at speeds which are critical for braking distance. The overload point of the brake force booster corresponds to that of a brake force booster with an internal combustion engine as the low pressure supplier.

According to an advantageous configuration of the inventive method, the first predefined, lower low-pressure level is lowered in a low speed range of the vehicle, whereby the number of load cycles of the motor pump unit can be reduced.

The second predefined, upper low-pressure level is preferably raised above a predefined speed of the vehicle. The low-pressure level in the low-pressure chamber of the brake force booster is thereby increased in particular at brake-critical speeds.

If the switch-off function of the motor pump unit above the predefined speed of the vehicle is combined with a time control system, the motor pump unit can be prevented from running continuously if the switch-off pressure is not reached.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures:

FIG. 1 shows a schematic system structure of a brake activation device of a motor vehicle brake system for carrying out the inventive method, and FIG. 2 shows a speed-pressure diagram of the brake activation device according to FIG. 1.

DETAILED DESCRIPTION OF THE PREFERRED EMBODIMENTS

FIG. 1 shows a schematic system structure of a brake activation device of a motor vehicle brake system.

It can be seen that the brake activation device for carrying out the method according to aspects of the invention comprises a pneumatic brake force booster 1, a brake master cylinder 2 arranged thereon and a pneumatic motor pump unit 3. Because the basic structure and operation of the brake activation device are generally known, only the features essential to the invention are described hereinafter.

The vehicle brake system is, for example, of the "brake-by-wire" type and can be activated independently of driver wish by means of an electronic control unit (ECU), that is, driver-independently, and also partially by means of a brake pedal (not shown) (mechanical fall-back level).

An interior (not shown) of the brake force booster 1 is divided by at least one movable wall into at least one low-pressure chamber and at least one working chamber. The brake master cylinder 2 has two pistons (not shown) which are displaceable in a housing and which each delimit with the housing a respective hydraulic pressure chamber. The pressure chambers are connectable to an unpressurized pressure medium container 4, and via outlets 5 to wheel brakes (not shown) of the motor vehicle brake system.

The motor pump unit 3 comprises a low-pressure pump 6, which is implemented, for example, as a diaphragm pump or piston pump, and an electric motor 7 driving the low-pressure pump 6. In order to create low pressure for the brake force booster 1, the low-pressure pump 6 is connected via a suction line 8 to the low-pressure chamber (not shown) of the brake force booster 1. A vacuum sensor 9 arranged on the brake force booster 1 or on the low-pressure pump 6 detects a low-pressure level P in the low-pressure chamber or a pressure difference between low-pressure chamber and working chamber, this detected pressure being evaluated in an electronic longitudinal-dynamics control unit (longitudinal-dynamics ECU) 10. Within the scope of the invention the vacuum sensor 9 may also be arranged in the suction line 8.

The longitudinal-dynamics control unit 10 which, in addition to the pressure signal of the vacuum sensor 9, also detects a speed signal from wheel rotational speed sensors (not shown) and therefore a speed v of the vehicle, can be connected via a bus system CAN (Controller Area Network) to an electronic engine control unit (engine ECU) 11, to a pump control unit (pump ECU) 12 which controls the motor pump unit 3, and to an ABS control unit (ABS ECU) (not shown) or ESP control unit (ESP ECU) (not shown), which are known in principle. It is also possible to control the motor pump unit 3 by means of the longitudinal dynamics ECU 10 or the ABS ECU or ESP ECU, without a separate pump ECU 12.

The engine ECU 11 detects a rotational speed signal of one or more drive units (engine/motor) (not shown) of the vehicle. It is thus additionally possible to control, for example, a rotational speed of the motor pump unit 3 as a function of the driving states of the vehicle, in order to minimize disturbing noises of the engine pump unit 3, which are felt to be intrusive especially before or during a start phase of the vehicle or of the vehicle drive, since no driving noises are yet present.

FIG. 2 shows a speed-pressure diagram of the brake activation device according to FIG. 1. As can be seen from the dashed line in FIG. 2, activation of the motor pump unit 3 is effected in a low speed range of the speed v of the vehicle—for example from 20 km/h to 45 km/h if the pressure falls below a first predefined, lower low-pressure level Pe of, for example, 0.55 bar low pressure in the low-pressure chamber. That is to say that the switch-on threshold is lowered in comparison to the known, usual value of 0.6 bar low pressure.

As is also apparent from FIG. 2, the switch-on threshold at standstill of the vehicle is fixed at 0.4 bar and the switch-off threshold at, for example, 0.5 bar.

Through the lowering of the switch-on and switch-off thresholds at standstill and in a low speed range, the number of load cycles of the motor pump unit 3 can be considerably reduced.

From 45 km/h to 95 km/h, activation is effected at the usual 0.6 bar low pressure. Above 95 km/h the motor pump unit 3 is switched on at a pressure of 0.8 bar low pressure. The low-pressure level P in the low-pressure chamber of the brake force booster is thus increased in particular at speeds v critical for braking distance, whereby the overload point of the brake force booster corresponds to that of a brake force booster with an internal combustion engine as the low pressure supplier.

Through this speed-dependent control of the motor pump unit 3, the critical number of load cycles and the overall running time of the low-pressure pump 6 or of the motor unit 3 are not increased as compared to conventional on/off control.

Furthermore, the switch-off function of the motor pump unit 3 above a predefined speed $v_n$ for example 90 km/h, can be combined with a time control factor of, for example, not more than 5 sec running time, as can be seen in FIG. 2. The switch-off threshold of the motor pump unit 3 can thereby be raised to 0.9 bar low pressure, the time control system preventing the motor pump unit 3 from running continuously in the event that the switch-off pressure is not reached.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for creating low pressure in a brake activation device of a motor vehicle brake system comprising (i) a pneumatic brake force booster having an interior that is divided into at least one low-pressure chamber and one working chamber, (ii) a brake master cylinder, and (iii) a pneumatic motor pump unit including a low-pressure pump and a motor that is configured to drive the low-pressure pump to create a low pressure in the low-pressure chamber, the method comprising the steps of:

detecting either a low-pressure level (P) in the low-pressure chamber or a pressure difference between the low-pressure chamber and the working chamber;

activating the motor pump unit if the pressure falls below a first predefined, lower low- pressure level (Pe) in the low-pressure chamber;

deactivating the motor pump unit if the pressure reaches a second predetermined, upper low-pressure level (Pa); and controlling the first predefined, lower low-pressure level (Pe) and the second predefined, upper low-pressure level (Pa) in the low-pressure chamber as a function of a speed (v) of the vehicle.

2. The method as claimed in claim 1, wherein the detecting step is accomplished by a sensor.

3. The method as claimed in claim 1, wherein the activating step and the deactivating step are accomplished by an electronic control unit.

4. The method as claimed in claim 1 further comprising the step of reducing the first predefined, lower low-pressure level (Pe) in a low speed range of the vehicle.

5. The method as claimed in claim 1 further comprising the step of increasing the second predefined, upper low-pressure level (Pa) when the speed (v) of the vehicle reaches a predefined speed ($v_n$).

6. The method as claimed in claim 5, wherein a deactivation function of the motor pump unit above the predefined speed ($v_n$) of the vehicle is combined with a time control system.

7. The method as claimed in claim 1, wherein the motor pump unit is controlled by an electronic pump control unit which is connected to an electronic longitudinal dynamics control unit of the vehicle by a bus system.

8. The method as claimed in claim 1, wherein the motor pump unit is controlled by an electronic longitudinal dynamics control unit of the vehicle.

9. The method as claimed in claim 1, wherein the motor pump unit is controlled by an electronic anti-lock braking system (ABS) or an electronic stability program (ESP) control unit which is connected to an electronic longitudinal dynamics control unit of the vehicle by a bus system.

10. A system for creating low pressure in a brake activation device of a motor vehicle brake system, comprising:
 a pneumatic brake force booster having an interior that is divided into at least one low-pressure chamber and one working chamber;
 a brake master cylinder;
 a pneumatic motor pump unit that is configured to create a low pressure in the low-pressure chamber, wherein the pneumatic motor pump unit includes a low-pressure pump and a motor that is configured to drive the low-pressure pump;
 a sensor that is configured to detect a low-pressure level (P) in the low-pressure chamber or a pressure difference between the low-pressure chamber and the working chamber; and
 an electronic control unit that is configured to (i) activate the motor pump unit if the pressure falls below a first predefined, lower low-pressure level (Pe) in the low-pressure chamber, and (ii) deactivate the motor pump unit if the pressure reaches a second predetermined, upper low-pressure level (Pa),
 wherein the first predefined, lower low-pressure level (Pe) and the second predefined, upper low-pressure level (Pa) in the low-pressure chamber are controlled as a function of a speed (v) of the vehicle.

* * * * *